F. YOUNGER.
SANITARY DISPENSING APPARATUS.
APPLICATION FILED JUNE 18, 1917.
1,295,665.
Patented Feb. 25, 1919.
3 SHEETS—SHEET 1.
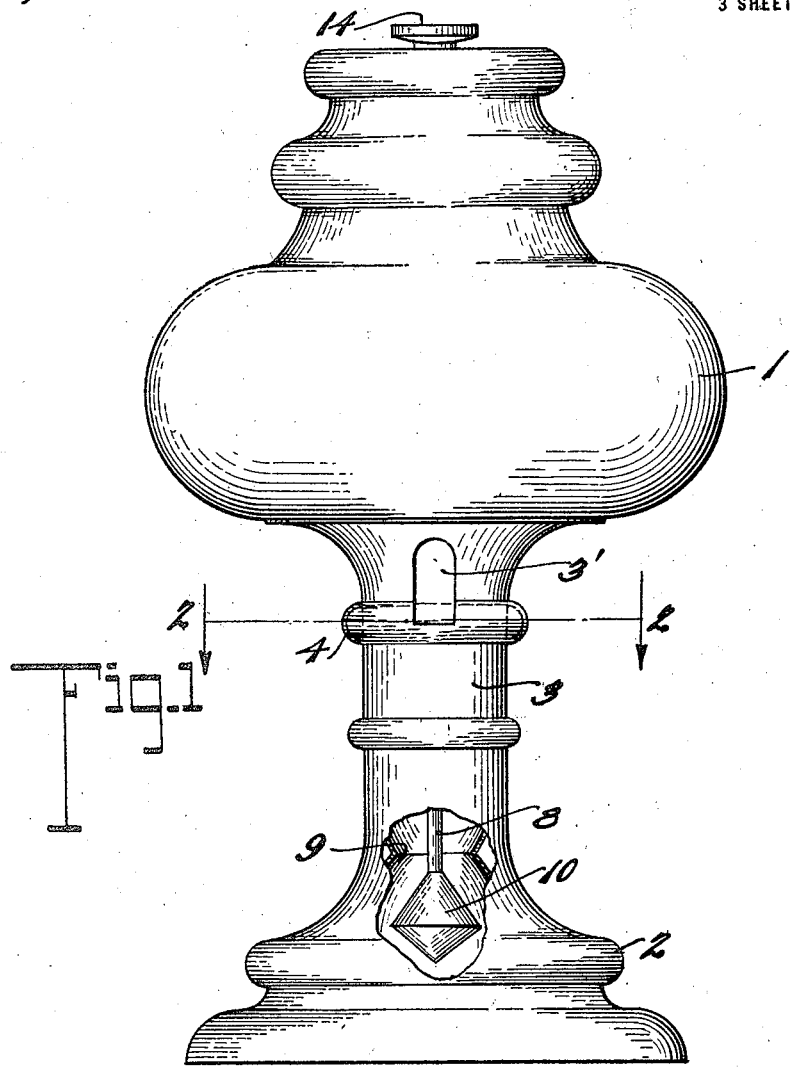
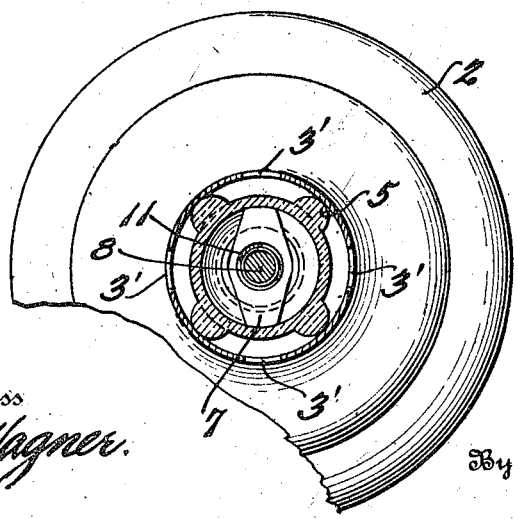
Witness
C. H. Wagner.
Inventor
Frank Younger
By Robb & Robb
Attorneys

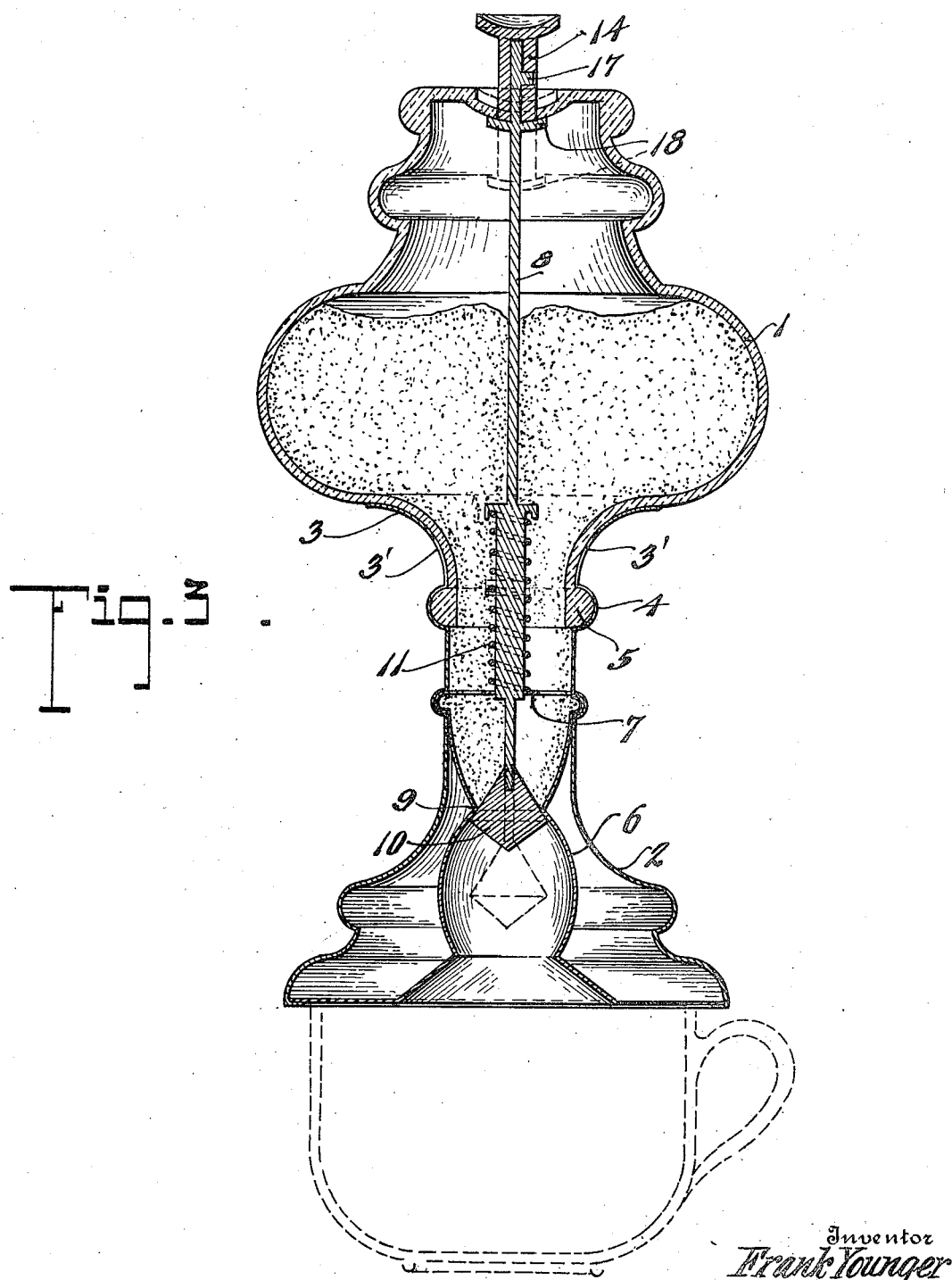

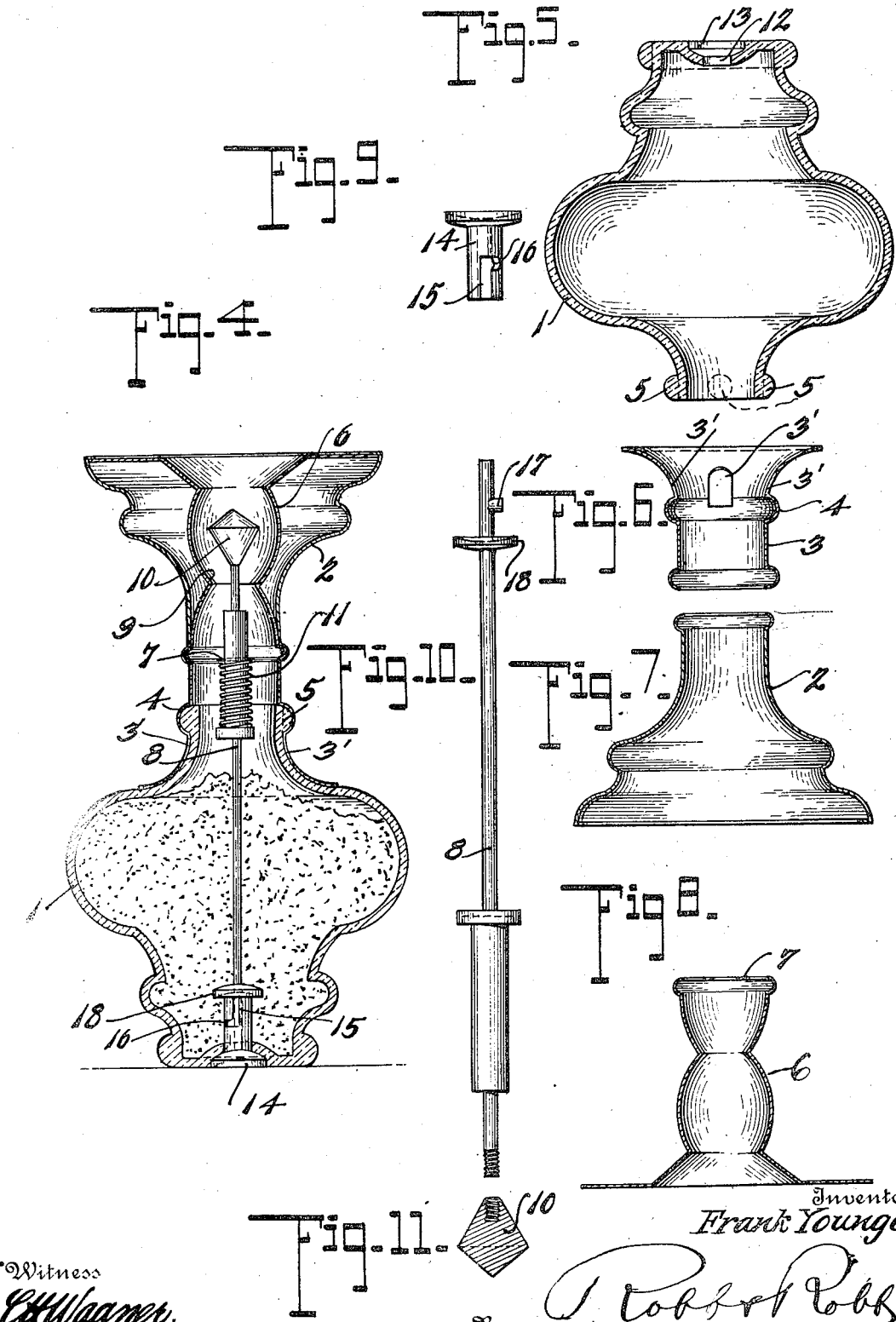

UNITED STATES PATENT OFFICE.

FRANK YOUNGER, OF WALLACE, CALIFORNIA.

SANITARY DISPENSING APPARATUS.

1,295,665.   Specification of Letters Patent.   Patented Feb. 25, 1919.

Application filed June 18, 1917. Serial No. 175,438.

*To all whom it may concern:*

Be it known that I, FRANK YOUNGER, a subject of the Emperor of Germany, but a declarant citizen of the United States, residing at Wallace, in the county of Calaveras and State of California, have invented certain new and useful Improvements in Sanitary Dispensing Apparatus, of which the following is a specification.

The present invention relates to improvements in dispensing apparatus and has for its object to provide a sanitary device for holding and delivering a relatively small quantity of the contents of a receptacle, without subjecting said contents to contamination by exposure or such as would be incident to the removal of the contents by spoons or similar utensils.

While the invention is capable of other uses, it is specifically designed for use in restaurants, lunch rooms, or similar places for the purpose of dispensing sugar and it comprises a receptacle for holding a quantity of the sugar and a manually operable plunger valve which upon depression will allow a small quantity of the sugar to pass from the receptacle into a cup or other container upon which the device may be placed.

By reason of its peculiar construction the contents of the apparatus are not handled by direct contact either in the filling or dispensing thereof and when it is desired to cleanse the device it is easily separated for this purpose.

With the above and other objects in view, this invention consists in the construction, combination and arrangement of parts all as hereinafter more fully described, claimed and illustrated in the accompanying drawings, wherein:

Figure 1 is a side elevation of the invention, a portion being broken away to show the valve in delivery position;

Fig. 2 is a horizontal sectional view on the line 2—2 of Fig. 1;

Fig. 3 is a vertical sectional view, and in position to deliver its contents to a cup;

Fig. 4 is a vertical sectional view, the device being inverted as when filling the receptacle;

Fig. 5 is a sectional view of the bowl section of the device;

Fig. 6 is a sectional view of the connecting sleeve;

Fig. 7 is a sectional view of the base section;

Fig. 8 is a sectional view of the funnel passage in the base section for filling and delivering the contents;

Fig. 9 is a detail view of the plunger head; and

Figs. 10 and 11 are similar views of the plunger body and valve, respectively.

Throughout the following detail description, and on the several figures of the drawings, similar parts are referred to by like reference characters.

Specifically describing the invention, 1 designates the body or receptacle portion of the apparatus and this may be made of any desired material, but preferably of glass. It is suitably supported by a base section 2 to which it is connected by means of an intermediate sleeve 3, the upper end of the latter being flared outwardly to form a seat for the receptacle and having a series of openings 3' adjacent to a groove spun in the sleeve, designated 4. The material of the receptacle is formed with certain protuberances 5 which are introduced into the openings 3' and upon rotation of the bowl these protuberances will engage with the groove aforesaid, thus providing a separable interlocking connection. At the lower end the sleeve is crimped onto the upper extremity of the base section.

Arranged in the base section is a somewhat funnel-shaped passage 6 which as shown in Fig. 3 is attached to the upper end of the base section. Across its upper end is a guide bridge 7 through which the lower end portion of the plunger 8 extends. The passage 6 is constricted at an intermediate point, as indicated at 9 for the purpose of forming a valve seat. At the discharge or lower end, the passage is flared and sufficient material is provided to extend over the area of the base section.

At its lower end, the plunger 8 is provided with a valve 10 which is detachably connected thereto and a spring 11 is coiled about an enlarged portion of the plunger, seating against the bridge 7, said spring holding the valve normally seated and preventing the contents of the receptacle from escaping. The tension of this spring is sufficient to withstand the weight of the contents resting thereagainst and to return it to seated position in the use of the device. The plunger extends through an opening 12 in the top of the receptacle which is preferably provided with a seat 13 to receive the flat extremity of the plunger head 14 when the latter is depressed the full limit of its movement. The head 14 is provided with a longitudinal passage 15 opening laterally to accommodate a projection 17 on the plunger, which projection is turned to engage the offset 16 to thereby lock the head on the plunger.

This opening through the top of the receptacle is effectively closed by the plate 18 integrally formed on the plunger so that no foreign matter, such as dust, may find access into the receptacle and owing to the fact that the device is disposed on its discharge opening it will be apparent that the contents of the bowl will remain uncontaminated.

In filling the receptacle it is only necessary to invert it as shown in Fig. 4, in which position the plunger is automatically moved inwardly and the valve unseated, whereupon the sugar or other commodity may be poured from original packages through the funnel-shaped passage 6 into the bowl. Again righting the position of the device will automatically effect closing of the valve and prevent escape of the said contents. To dispense the sugar, the apparatus is lifted up and placed on the receptacle or over the same as shown in Fig. 3 and by depressing the plunger the desired distance a small quantity of the sugar will be allowed to pass through the discharge opening. Since the plunger operates in the passage from the receptacle to the discharge opening, the sugar cannot become lodged therein. One of the main advantages of such a device is the fact that waste of the contents is precluded.

To cleanse, the head 14 is detached and the bowl given a partial turn enabling its displacement from the base section. A thoroughly sanitary apparatus is thus provided.

Having thus described my invention, what is claimed as new is:—

1. In dispensing apparatus of the class described, a base section having a discharge outlet, a receptacle having an open bottom disposed on said base section, and a plunger having its head projecting at one end from the top portion of the receptacle and having a valve at its other end normally closing the discharge outlet, said plunger head being subject to movement into the receptacle incident to disposing the apparatus in inverted position on its upper end so as to lie flush with the top of the receptacle and permit the latter to stand on end whereby to hold the valve unseated for filling the receptacle through the discharge outlet.

2. In dispensing apparatus of the class described, a receptacle having an open bottom, a base section having a funnel-shaped passage therein spaced from its walls and constituting a filling and discharging passage, and a plunger valve closing said passage and depressible to deliver a quantity of the contents of the receptacle.

3. In dispensing apparatus of the class described, a receptacle having an open bottom, a base section having a funnel-shaped passage therein separate from its walls and constituting a filling and discharge passage and provided with a valve seat, a plunger having a valve coacting with said seat, said plunger having a manipulating head movable into the receptacle and detachably connected thereto, and a connecting member intermediate the receptacle and the base section.

4. In dispensing apparatus of the class described, a receptacle having an open bottom and a depression in its top, a base section therefor having a delivery passage therethrough, said passage having an intermediate constricted portion forming a valve seat, and means for controlling the passage of the contents of the receptacle through said passage comprising a plunger having a valve coacting with the said seat, said plunger having a head piece projecting from the receptacle and movable into the depression aforesaid, and means for holding the valve in seated position.

In testimony whereof I affix my signature.

FRANK YOUNGER.